(12) United States Patent
Das et al.

(10) Patent No.: US 7,639,908 B2
(45) Date of Patent: Dec. 29, 2009

(54) BROADCASTING ARRAYED WAVEGUIDE

(75) Inventors: Saurav Das, Stanford, CA (US); Boris Grek, Hayward, CA (US); Jacob Sun, Saratoga, CA (US)

(73) Assignee: Enablence USA Components, Inc., Fremont, CA (US)

( * ) Notice: Subject to any disclaimer, the term of this patent is extended or adjusted under 35 U.S.C. 154(b) by 0 days.

(21) Appl. No.: 12/011,070

(22) Filed: Jan. 23, 2008

(65) Prior Publication Data
US 2009/0185806 A1 Jul. 23, 2009

(51) Int. Cl.
*G02B 6/28* (2006.01)
*G02B 6/34* (2006.01)
(52) U.S. Cl. .............................. 385/24; 385/37; 398/68
(58) Field of Classification Search ................... 385/15, 385/24, 27, 31, 37, 39; 398/68
See application file for complete search history.

(56) References Cited
U.S. PATENT DOCUMENTS 5,440,416 A * 8/1995 Cohen et al. ................. 398/82
5,546,483 A * 8/1996 Inoue et al. ................... 385/14
5,926,298 A * 7/1999 Li ................................ 385/24
6,049,640 A * 4/2000 Doerr .......................... 385/15
6,381,383 B1 * 4/2002 Bernasconi et al. ........... 385/24
6,516,119 B2 * 2/2003 Menezo et al. ............... 385/37
6,678,446 B1 * 1/2004 McGreer et al. ............. 385/37

* cited by examiner

*Primary Examiner*—Daniel Petkovsek
(74) *Attorney, Agent, or Firm*—Innovation Counsel LLP

(57) ABSTRACT

The invention is a data transmission device that includes: an input Free Propagation Region (FPR) receiving a multi-wavelength signal and a single-wavelength signal, and two sets of arrayed waveguides coupled to the input FPR to carry the multi-wavelength signal and the single-wavelength signal, respectively. The arrayed waveguides demultiplex the multi-wavelength signal and create copies of the single-wavelength signal. The output plane of an output FPR receives the demultiplexed wavelengths and the copies of the single-wavelength signal such that one of the demultiplexed wavelengths and one of the copies of the single-wavelength signal focus onto the same position on the output plane. The device allows data (e.g., video stream) to be broadcast to all subscribers in a Wavelength-Division-Multiplexed Passive Optical Network (WDM-PON) architecture. A multicasting apparatus can be implemented by using a plurality of these devices and using different wavelengths for the single-wavelength signal for the different devices.

10 Claims, 14 Drawing Sheets

BROADCASTING ARRAYED WAVEGUIDE

FIELD OF INVENTION

This invention pertains generally to optical devices and particularly to an arrayed waveguide grating device.

BACKGROUND

Today, video stream transmission is rapidly becoming an integral part of access network traffic. In video stream transmission, both broadcast transmission and multicast transmission play important roles. In a nutshell, a broadcast transmits information to all of a device's potential destinations simultaneously while a multicast can transmit information to just a subgroup of destinations simultaneously. There are several techniques that deal with broadcast for TDM access networks such as BPON/GPON/EPON. These techniques include using a sub-carrier multiplexing technique or a frequency division multiplexing (FDM) technique. The sub-carrier multiplexing technique multiplexes digital base-band and RF video signals in frequency domain and then modulates the mixed signal onto a single wavelength. The frequency division multiplexing (FDM) technique (a CWDM-based approach) uses a separate wavelength for video.

However, traditionally, broadcasting a data or video stream to all subscribers at once has been difficult in a Wavelength-Division-Multiplexed Passive Optical Network (WDM-PON) architecture. The reason for this difficulty is that the output ports of the wavelength selective devices of the Optical Distribution Network (ODN) only pass a specific wavelength channel on each specific output port destined to a subscriber, as shown in FIG. 1. Hence, there is no one common wavelength that reaches all customers.

FIG. 2 shows one way of overcoming this limitation in the WDM-PON architecture. In the implementation shown in FIG. 2, a bypass WDM coupler is used to separate the video signal (which is on a separate wavelength) before the AWG demux, and then the video wavelength is split using a 1×16 power splitter and added to each user's downstream data wavelength. The extra bypass splitter and other WDM couplers required in this scheme are an overhead which can be avoided by intelligent use of components. Note that the number of WDM couplers required scales with the number of subscribers (16, 32, 64 etc.) and the number of fusion splices scale as 3× the number of subscribers.

FIG. 3 shows another scheme that allows video broadcast in the WDM-PON architecture. This scheme uses an N×N AWG, a laser operating at 1530 nm in the OLT for downstream broadcast video, and WDM lasers in the 1550 nm band for downstream WDM data. The ONUs use LEDs in the 1310 nm band for upstream data. At the remote node, the downstream WDM channels are first passed through a 1310 nm/1550 nm coupler for separating the upstream and downstream channels. The 1530 nm downstream video is then separated from the data and split into 15 components using a 1×15 splitter. These 15 video streams are distributed to the 15 ONUs via a 16×16 AWG router. The last port of the AWG router demultiplexes the 15 WDM data streams sending each to its corresponding ONU. The downstream data and video can then be detected using a PIN photodiode at the ONU. The N×N Remote Node can be further optimized by incorporating the 1×15 splitter into the AWG for a single device implementation.

FIGS. 4A and 4B show yet another scheme for broadcasting video in a WDM-PON architecture. This scheme uses broadcast and selection. FIG. 4A shows the network for this scheme and FIG. 4B shows the structure of ONU pairs. The downstream link from the OLT to the remote node is a simple downstream CWDM link which is then split and broadcast to each of the N ONUs. At the ONUs, the downstream data is separated from the broadcast video using a band filter. Then, the video is passed through a coupler to get the received video stream. The data stream is passed through a 3-port TFF for separating the receive data and adding the transmit data to the stream. The data stream is then multiplexed again with the video stream to form a protection path for the neighboring ONU. Although this scheme gives a simplified network structure and provides a protection path for the ONUs, the extra fiber required for connecting the ONU pairs and complexity of each ONU may make this impracticable.

The scheme shown in FIG. 5 uses a broadband light source for broadcast downstream. The WDM data and broadcast video are sent in a TDM fashion using a fast optical switch on the OLT. The video broadcast stream is transmitted by using a broadband light source with an external modulator. The network structure including the Remote node does not change for accommodating the broadband video transmission. The ONU can use the same receiver for receiving both the data and video to time de-multiplex the two.

Each of the above methods has its disadvantage(s). For example, the N×N AWG scheme shown in FIG. 3 requires several components leading to excess loss for the video signal (2 WDM couplers(2 dB)+1×16 splitter (13 dB)+N×N AWG(6 dB)=21 dB). Integrating the splitter with the N×N AWG can be tricky due to the requirement for the latter to be an athermal device, which in turn requires special packaging techniques. If not integrated, the device can be bulky due to several splices/connectors between the couplers, the splitter and the AWG. The broadcast and selection scheme shown in FIGS. 4A and 4B increases the complexity of the ONU and requires extra fiber layout. The TDM scheme shown in FIG. 5 reduces the data bandwidth because of time multiplexing and the noise performance will degrade at higher data rates due to the modulation of a broadband source.

A device and method that allows broadcasting in a WDM-PON architecture without the above disadvantages is desired.

SUMMARY

In one aspect, the invention is a data transmission device that includes: an input Free Propagation Region (FPR) receiving a multi-wavelength signal and a single-wavelength signal; a first set of arrayed waveguides coupled to the input FPR to carry the wavelengths in the multi-wavelength signal; a second set of arrayed waveguides coupled to the input FPR to create multiple copies of the single-wavelength signal; and an output FPR having an output plane. The output plane receives the wavelengths from the first set of arrayed waveguides and the copies of the single-wavelength signal from the second set of arrayed waveguides such that one of the wavelengths from the first set of arrayed waveguides and one of the copies of the single-wavelength signal focus onto the same position on the output plane.

In another aspect, the invention is a multicasting apparatus that includes two or more of the above-described data transmission devices, wherein the single-wavelength signals are of different wavelengths for different data transmission devices.

In yet another aspect, the invention is a data transmission method that entails: inputting a multi-wavelength signal and a single-wavelength signal to an input Free Propagation Region (FPR) of an arrayed waveguide device; passing the wavelengths in the multi-wavelength signal through a first set of arrayed waveguides coupled to the input FPR; creating copies of the single-wavelength signal by passing it through a second set of arrayed waveguides coupled to the input FPR; and focusing one of the wavelengths exiting the first set of arrayed waveguides and one of the copies of the single-wavelength signal exiting the second set of arrayed waveguides onto the same position on an output plane.

DESCRIPTION OF THE EMBODIMENTS

The invention includes a device that enables broadcasting in a WDM-PON architecture without incurring excess loss or requiring extra components. The device integrates a passive and simple remote node. Normally, the remote node in a WDM-PON architecture is an AWG that serves as a demultiplexer. The invention modifies this AWG to simultaneously demultiplex the ONU wavelengths and split the broadcast wavelength.

Figure 1:
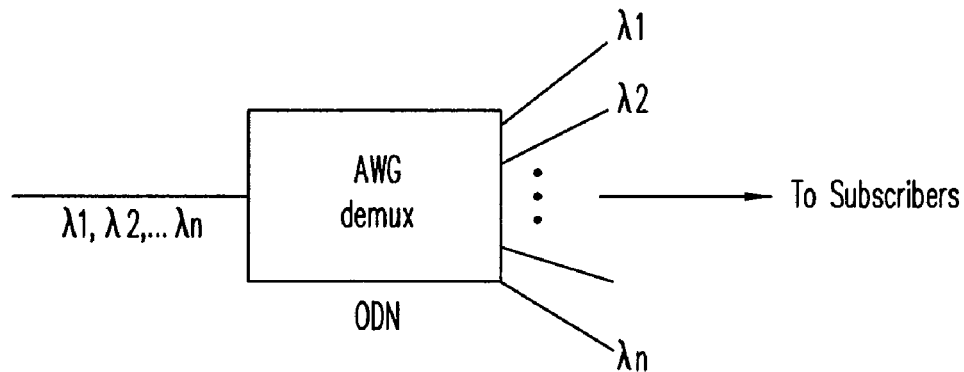
FIGS. 1-5 show currently-known schemes for broadcasting video transmission.
Figure 2:
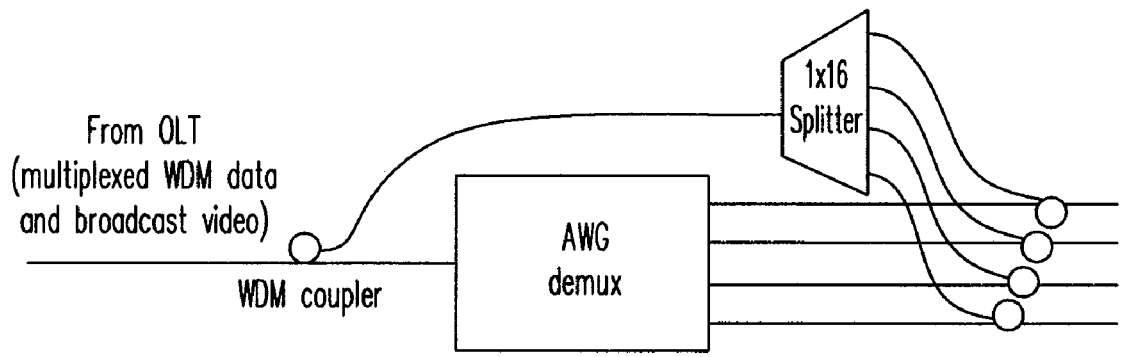
Figure 3:
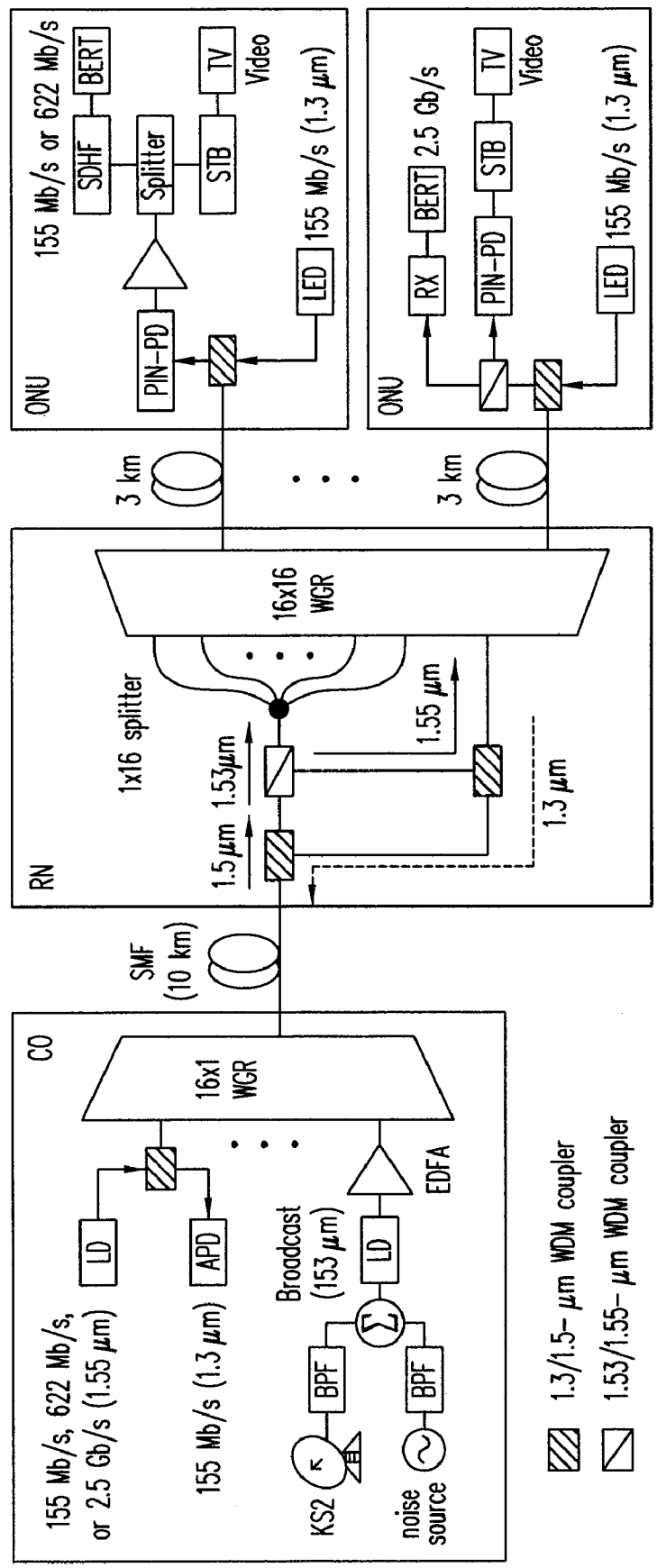
Figure 4A:
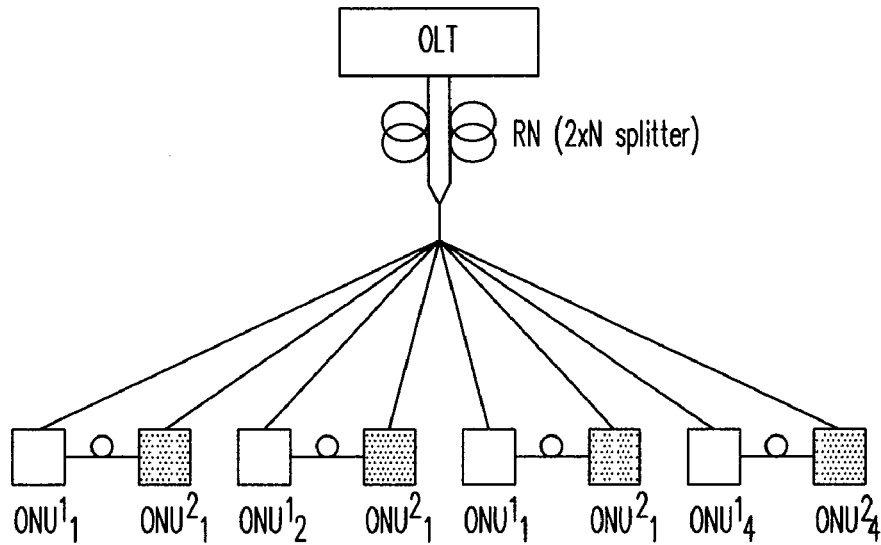
Figure 4B:
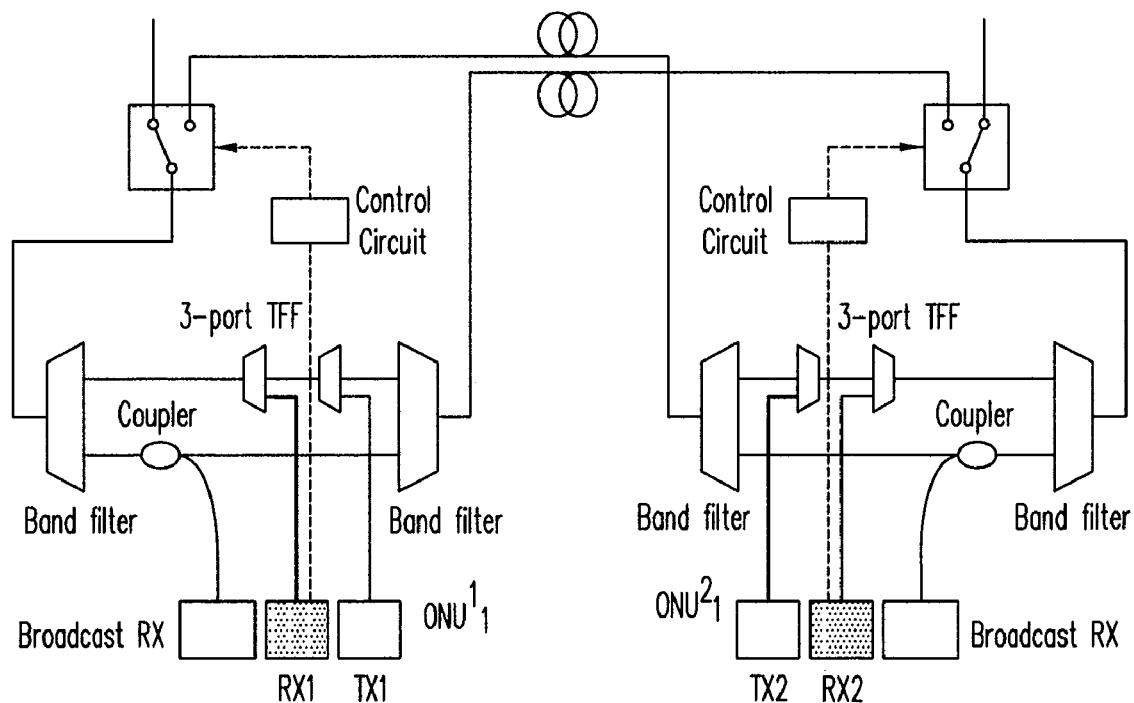
Figure 5:
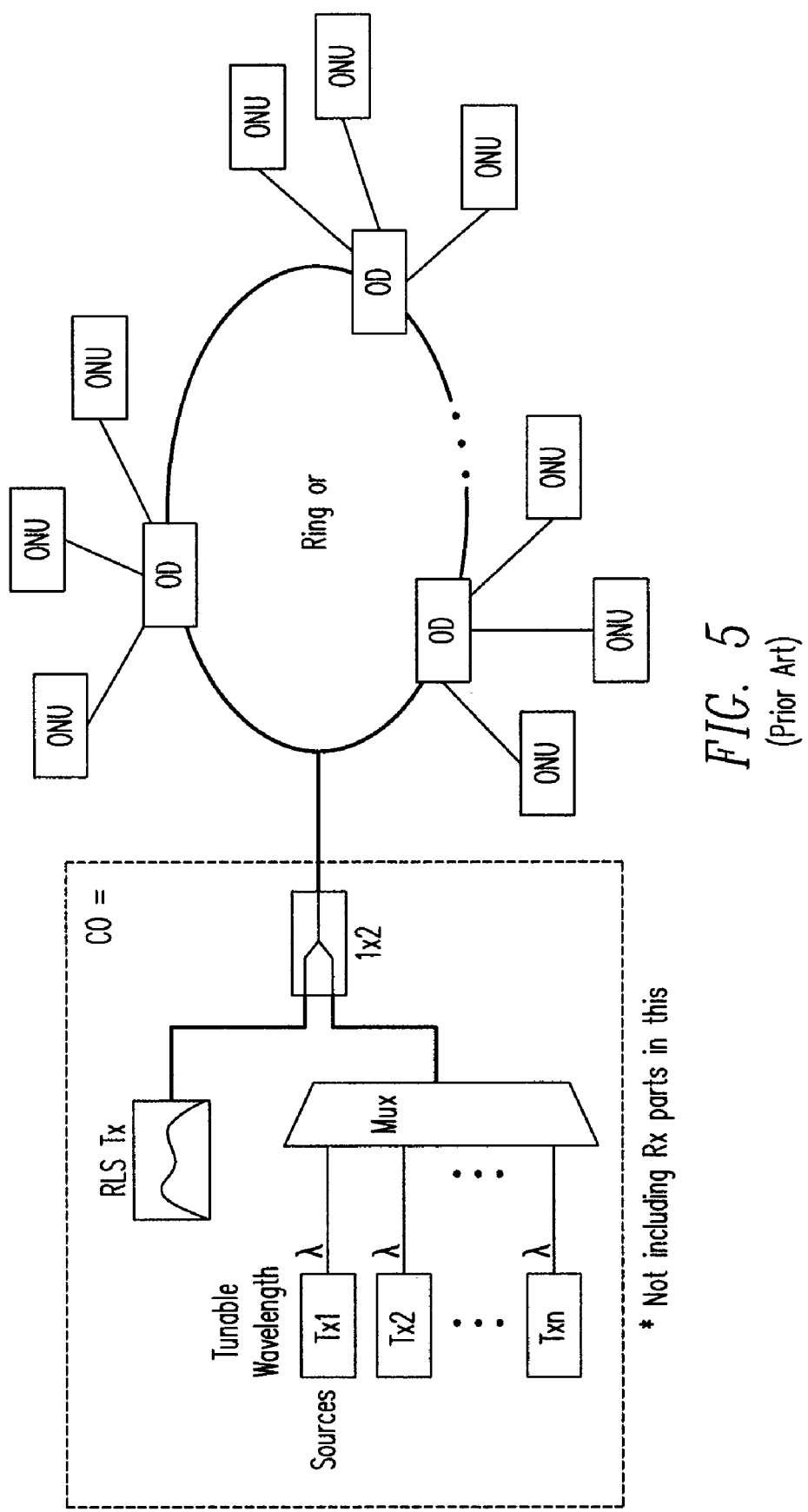
Figure 6:
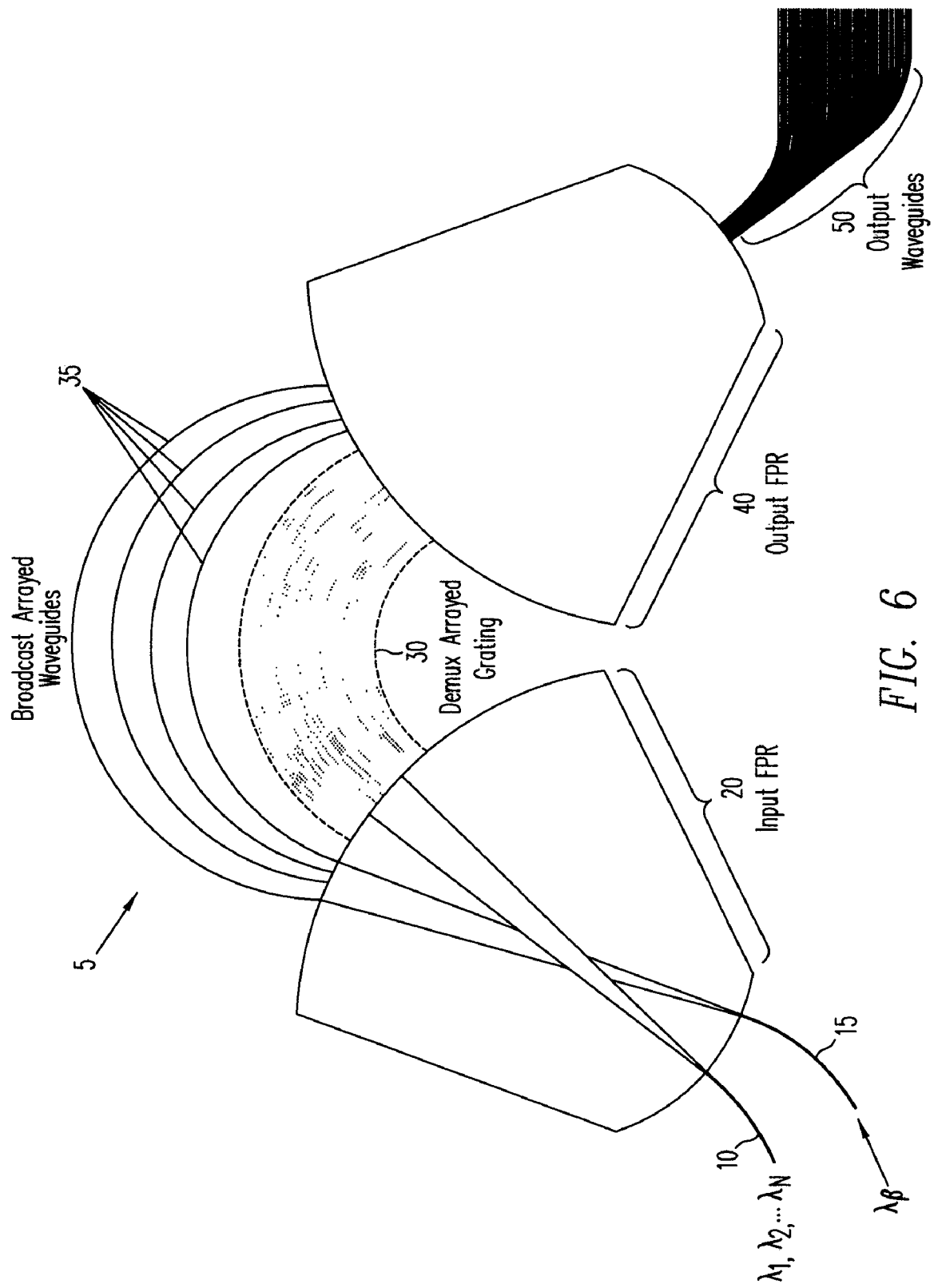
FIG. 6 shows an arrayed waveguide grating device according to the present invention.

Standard AWG design involves the use of a waveguide grating where incoming light (of mixed wavelengths) is launched with the same phase into each of the waveguides that make up the array. Referring to FIG. 6, this standard AWG design is accomplished by letting the light beam from a first input waveguide (e.g., the Demux input waveguide) 10 expand laterally in the slab waveguide, indicated as an input Free Propagation Region (FPR) 20. From the input FPR 20, the light beams travel onto the first set of arrayed waveguides 30. The waveguides in the first set of arrayed waveguides 30 vary in length by a regular increment of $\Delta L$ such that the wavelengths traveling in the array waveguides 30 develop phase differences, and the interference and diffraction among the different wavelengths cause the different wavelengths to emerge at different angles and focus on different output waveguides 50. Through this process, a multiplexed signal can be demultiplexed into a plurality of signals having different wavelengths. As shown, the wavelengths from the first set of arrayed waveguides 30 reach the output waveguides 50 via an output FPR 40. Signals of different wavelengths are focused into different output waveguides 50.

Figure 7:
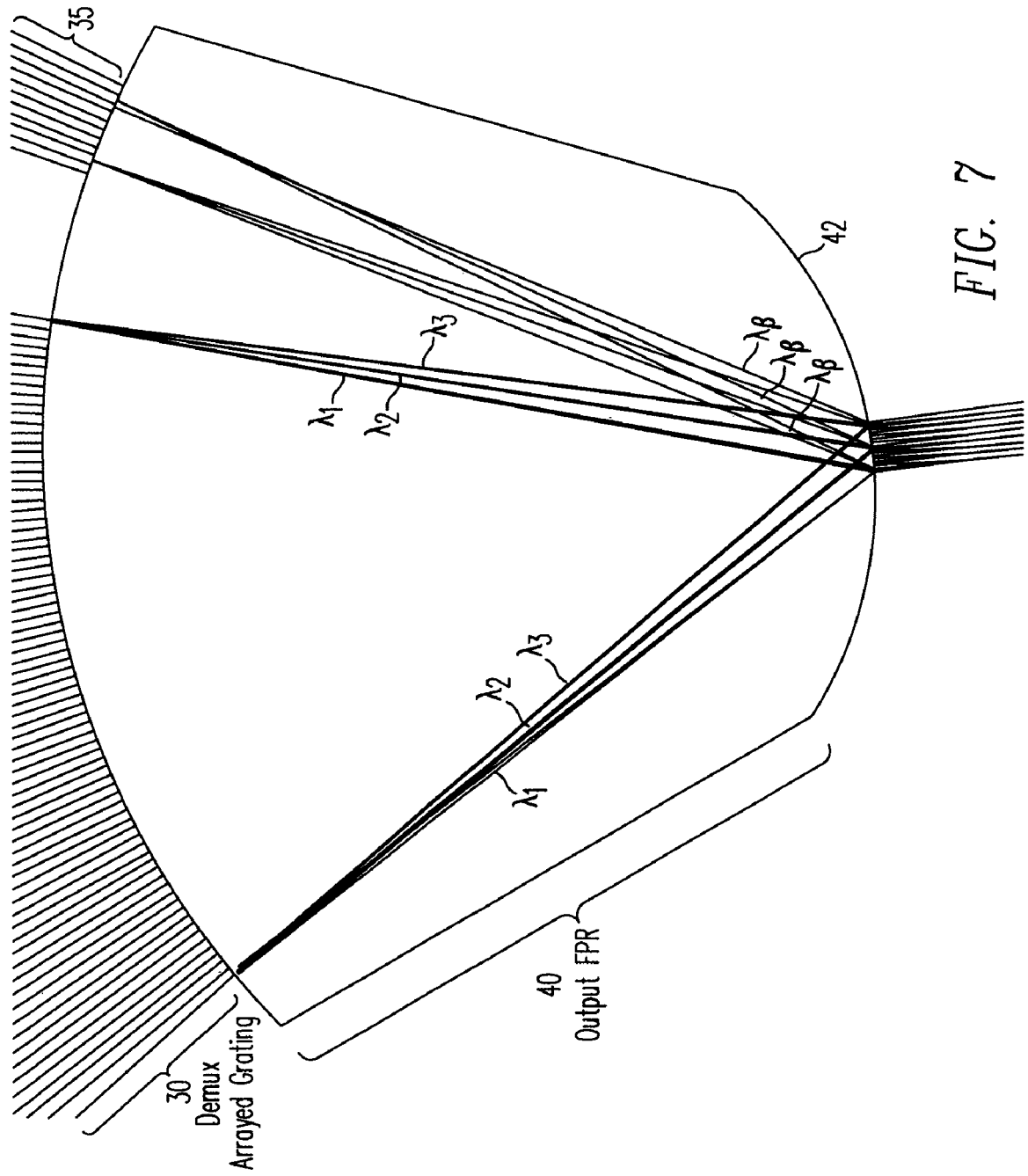
FIG. 7 shows the function of the output FPR in the arrayed waveguide grating device of FIG. 6.

FIG. 7 shows the details of how light beams travel through the output FPR 40. Specifically, FIG. 7 shows three wavelengths $\lambda_1, \lambda_2, \lambda_3$ from each of the outermost waveguides in the first set of arrayed waveguides 30 focusing into the center output waveguide and two edge output waveguides at an output plane 42, thereby entering the output waveguides 50.

The AWG device of the invention (such as AWG device 5) differs from the standard AWG design in that it includes a second set of array waveguides 35. As shown in FIGS. 6 and 7, the input FPR 20 separately receives light beams from two input waveguides: the first input waveguide 10 and a second input waveguide 15. The first input waveguide 10 receives a signal with mixed wavelengths $\lambda_1, \lambda_2, \ldots \lambda_N$ and the second input waveguide 15 receives a signal that is single-wavelength $\lambda_B$. The N wavelengths from the first input waveguide 10 and the single broadcast wavelength $\lambda_B$ have already been separated by a simple WDM coupler (not shown) before entering the AWG device 5 of FIG. 6 and FIG. 7, so that they enter the input FPR 20 from different locations. Like the wavelengths entering the first input waveguide 10, the broadcast wavelength $\lambda_B$ uses the input FPR 20 to expand into a spherical wavefront and launch into the arrayed waveguides. However, unlike the demux wavelengths, which launch into the first set of arrayed waveguides 30, the broadcast wavelength $\lambda_B$ launches into the second set of arrayed waveguides 35. The exact arrangement and number of waveguides shown in FIG. 6 are chosen for clarity of illustration and are not limitations of the invention. The properties of the second set of arrayed waveguides 35 are such that upon reaching the output FPR 40, multiple copies of the single broadcast wavelength $\lambda_B$ exit the arrayed waveguides 35 and launch into the output waveguides 50. Thus, each of the output waveguides 50 that receives the demux wavelengths also receives a copy of the broadcast wavelength $\lambda_B$ from the arrayed waveguides 35. FIG. 7 shows the demux wavelengths from the first set of arrayed waveguide 30 and copies of the broadcast wavelength from the second set of waveguides 35 being combined into three output waveguides 50. By adding the second set of waveguide arrays 35 to the diffraction grating function, the AWG device 5 is made capable of performing the demultiplexing/multiplexing operation and simultaneously functioning as a power splitter. Hence, this design does not require a separate power splitter, N WDM coupler, or 3N fusion splices at the N outputs of the remote node.

The arrayed waveguides 30 that receive the demux wavelengths are designed to demultiplex wavelength channels spaced 200 GHz apart (as on the ITU grid). The AWG device 5 including a diffraction grating function whereby a single wavelength exits an array out of different positions, it produces diffraction orders m, m+1, m−1, m+2, m−2, etc. The grating order m focuses into one of the output waveguides 50. The m+1 and m−1 orders focus into different ones of the output waveguides 50 than the order m, but these carry very little power due to the large spatial separation of the focus points. The fact that the m+1 and m−1 orders focus into the output waveguides 50 indicates that the arrayed waveguides 30 was designed for a very large Free Spectral Range (e.g., several THz).

Figure 8:
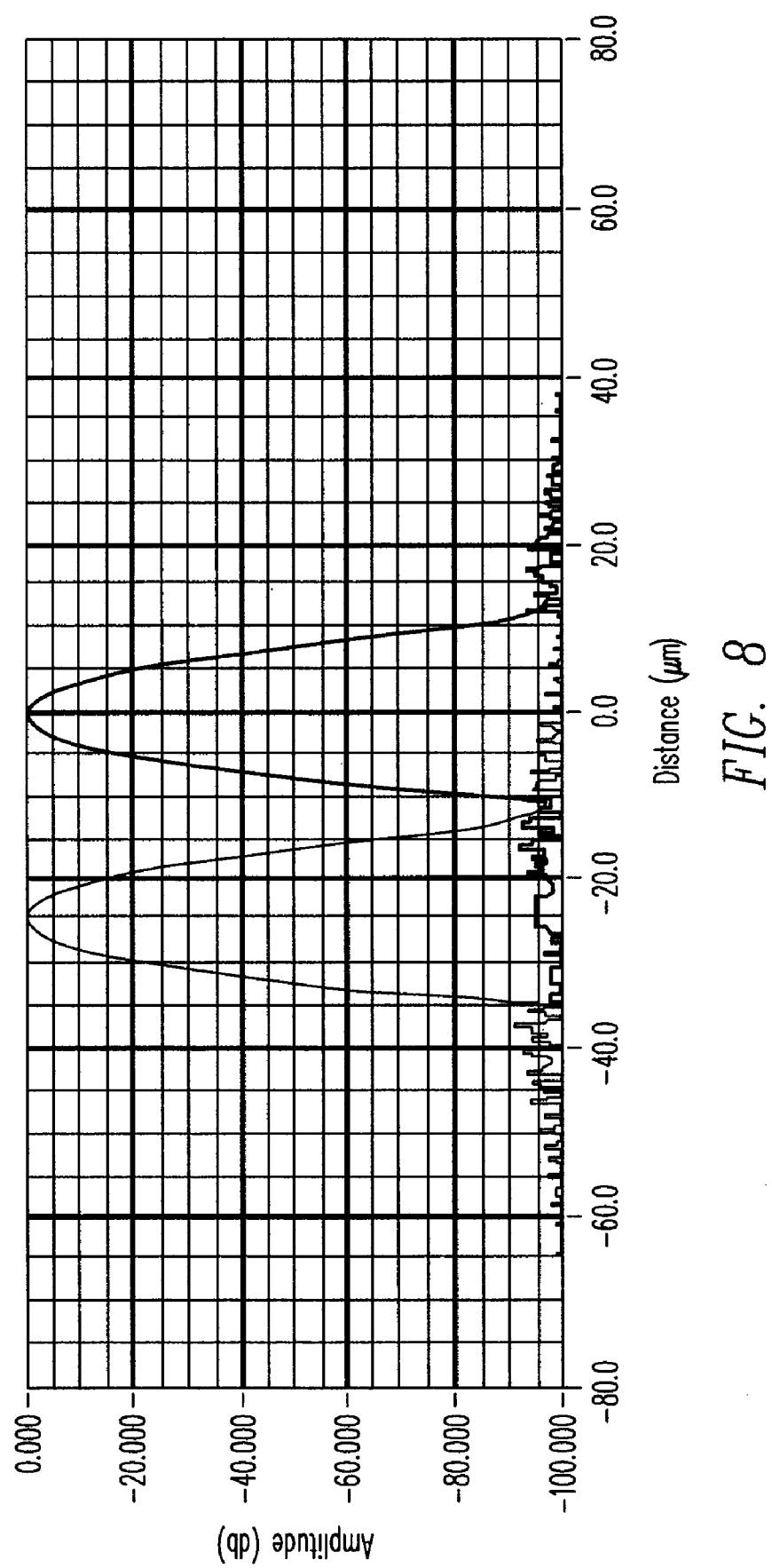
FIG. 8 shows a spatial separation of 200 GHz-spaced demux wavelengths.
Figure 9:
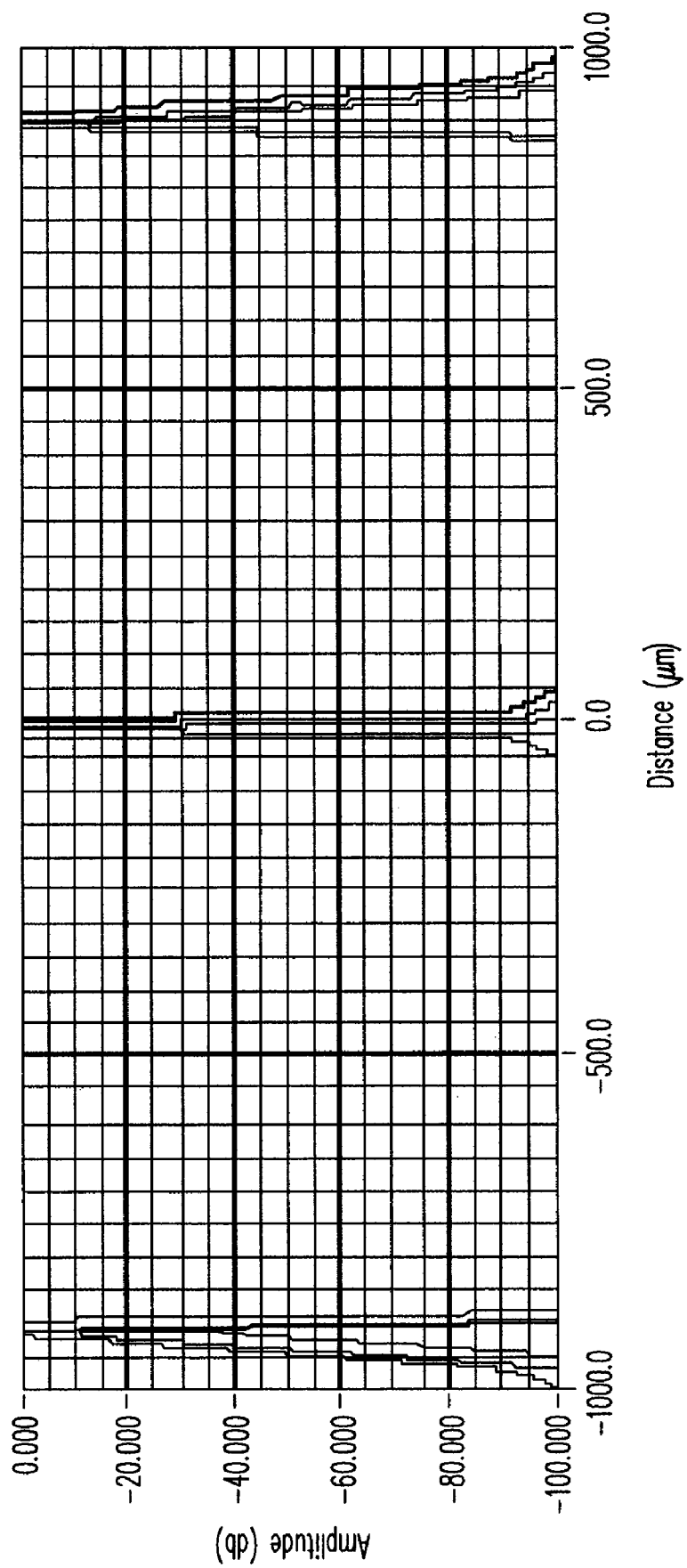
FIG. 9 shows a spatial separation of adjacent orders for the same wavelengths as in FIG. 8.

FIG. 8 shows the spatial channel separation (~25 μm) between two demux wavelengths at the output plane 42 of the output FPR 40. The spatial FSR for the same two wavelengths can be seen in FIG. 9 as about 900 μm. "Spatial FSR," as used herein, refers to the difference between focal positions of different orders for the same wavelength.

The AWG device is a periodic device in which the m-th order of $\lambda_1$ and the m+1-th order of another wavelength, say $\lambda_{50}$, focus out at the same position on the output plane 42. Thus, the AWG device cannot be used to demultiplex $\lambda_1$ and $\lambda_{50}$. However, the AWG device can be used to demultiplex all wavelengths that lie between $\lambda_1$ and $\lambda_{50}$ as they will focus on points that are spatially between various orders of $\lambda_1$ and $\lambda_{50}$. "Channel spacing" refers to the spatial spacing between the focal points of $\lambda_1$ and $\lambda_2$, or between the focal points of $\lambda_2$ and $\lambda_3$ and so on. "Channel spacing" may also refer to the spacing between $\lambda_1$ and $\lambda_2$ in the frequency domain (say 200 Ghz). "Free Spectral Range" is the spatial spacing (e.g., 900 μm) between the focal points for $\lambda_1$ and $\lambda_{50}$ (or for different orders of $\lambda_1$) on the output plane 42. "Free Spectral Range" may also refer to the frequency separation between $\lambda_1$ and $\lambda_{50}$ (e.g., several Thz).

Figure 10:
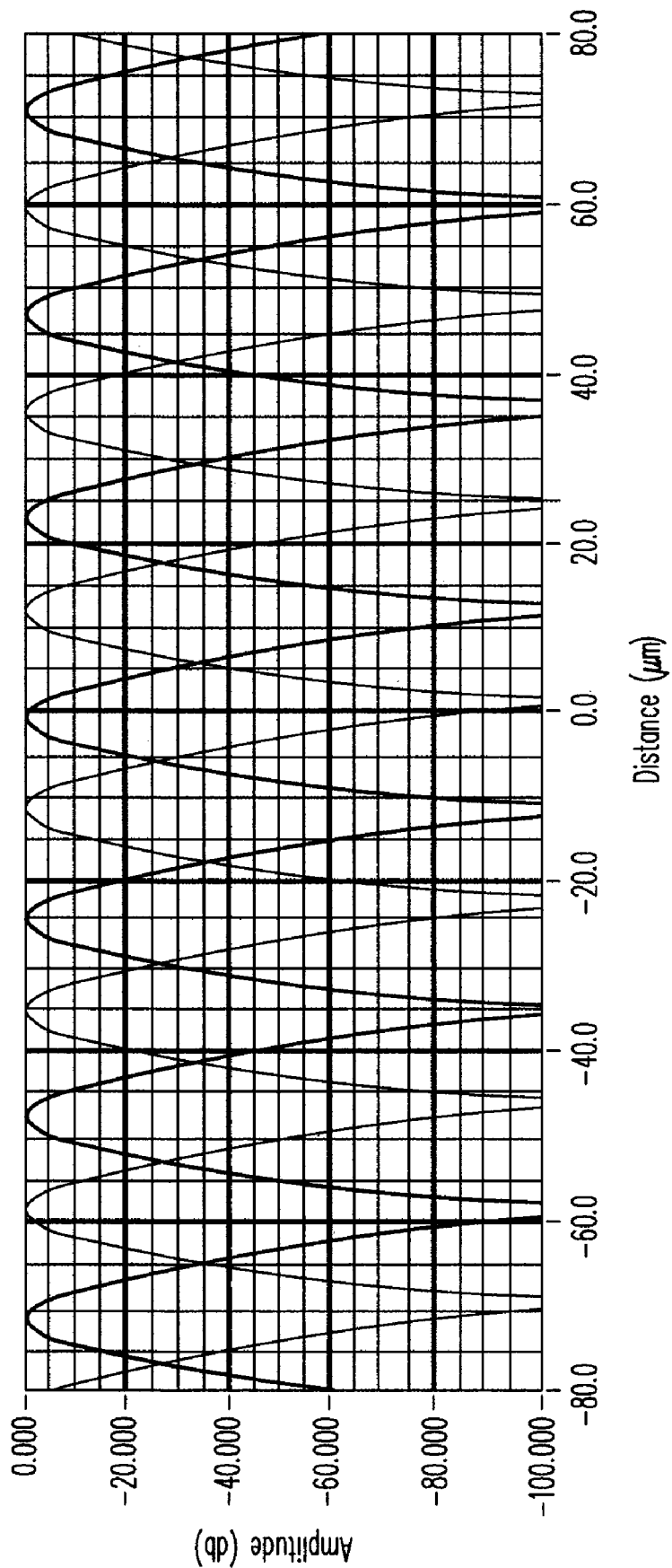
FIG. 10 shows the distribution of multiple broadcast wavelengths on an output plane of the output FPR.

In the AWG device 5 of the invention, the first set of arrayed grating 30 has a large FSR, thus allowing a wide range of wavelengths to be demultiplexed. Compared to the first arrayed waveguides 30, the second arrayed waveguides 35 used for the broadcast wavelength is designed to have a much narrower FSR (and thus a much narrower spatial separation). Preferably, the FSR of the second set of arrayed grating 35 is substantially equal to the channel spacing of the first set of arrayed grating 30. This way, all the diffraction orders of the second arrayed waveguides 35 will focus out of the same output waveguides 50 as the demultiplexed wavelengths of the first arrayed waveguides 35. This is shown in FIG. 10, where the dotted line (the broadcast wavelength) has multiple copies of itself on both sides of the center of the output plane 42. These multiple copies correspond to the adjacent orders (m+1, m−1, m+2, m−2 and so on). Moreover, the spatial FSR is about 25 μm, the same as the channel spacing from the first arrayed waveguides 35 (FIG. 8).

FIG. 10 also shows a second broadcast wavelength in solid line. Although the FSR for the second broadcast wavelength is the same as for the first broadcast wavelength that is shown in dotted line, its focal points are not at the output waveguide locations. Hence, this particular design will not work for multiple broadcast wavelengths.

Figure 11:
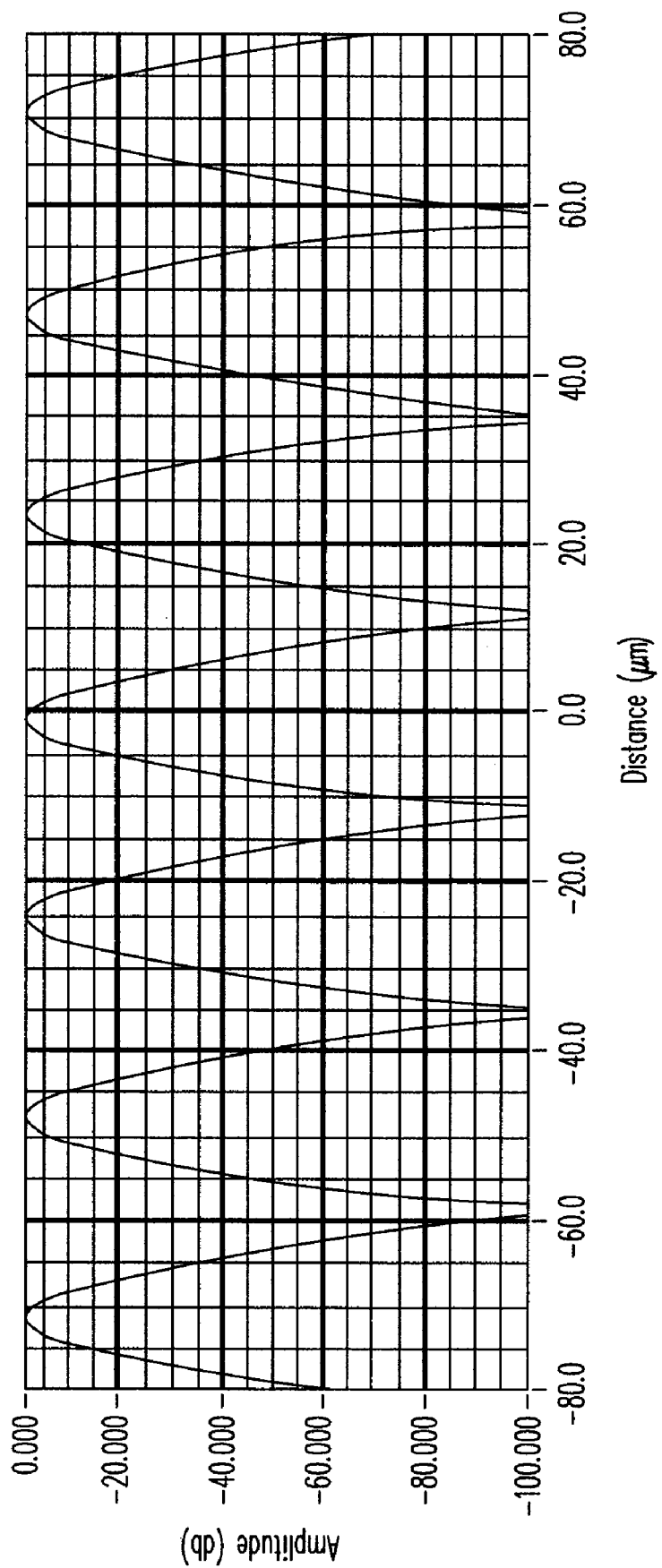
FIG. 11 shows the distribution of multiple broadcast wavelengths on an output plane of the output FPR for an alternative embodiment.

In an alternative embodiment, the second set of arrayed waveguides 35 is designed for a "normal" order (20-50) and the broadcast wavelength reproduces its higher adjacent orders, purely from a geometrical construction, at the same output waveguide locations. FIG. 11 shows that the position of the higher orders can be controlled by choosing an appropriate pitch of the first and second sets of array waveguides 30, 35 and an appropriate radius for the input and output FPRs 20, 40. Note that the FSR is still several times greater than the channel separation (due to low order), but the channel separation is so small that it is negligible in space (cannot separate the two broadcast wavelengths in FIG. 11). This second embodiment enables broadband operation of the AWG device 5. In other words, the same AWG device 5 can be used to provide broadcast operation at one broadcast wavelength in one WDM-PON, and at a different wavelength in another WDM-PON.

Figure 12:
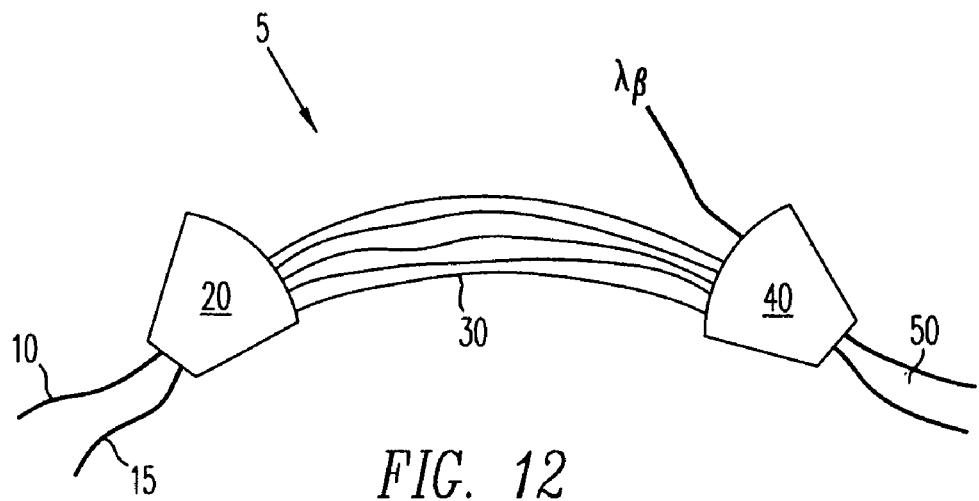
FIG. 12 depicts an alternative embodiment of the AWG device.

In yet another embodiment, the second arrayed waveguides 35 would be such that the output FPR acts as a star coupler. In this embodiment, the array is no longer a grating and the output FPR 40 serves as an integrated power splitter. FIG. 12 depicts this third embodiment where the multi-wavelength signal from the first input waveguide 10 is fed into the input FPR 20 but the single-wavelength signal $\lambda_B$ is not. In this embodiment, the single-wavelength signal $\lambda_B$ is fed directly into the output FPR 40 and does not pass through the second set of arrayed waveguides 35. The specifics of the output FPR 40 is manipulated to achieve the desired amount of spreading, for example by making structural changes.

Figure 13:
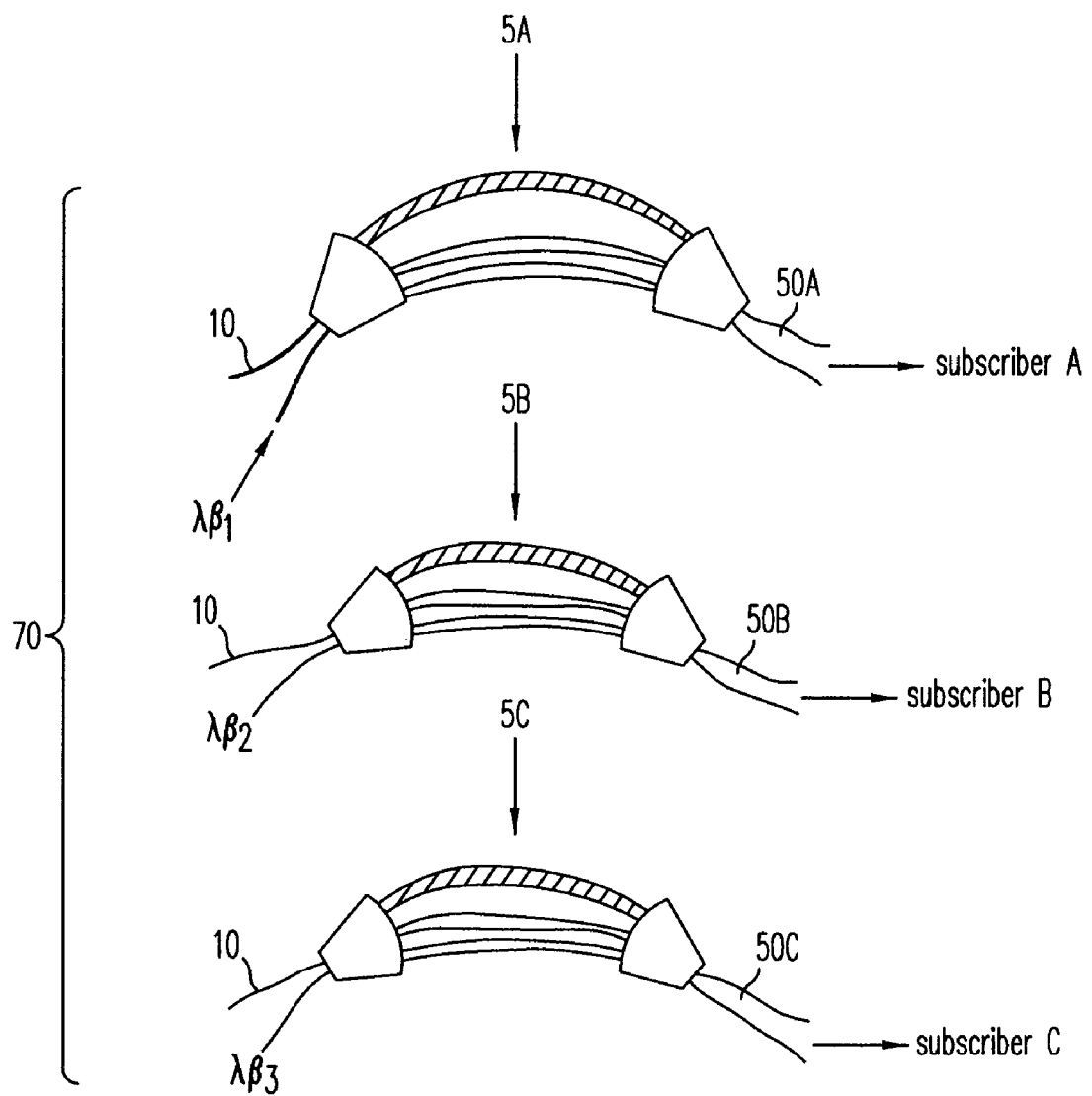
FIG. 13 depicts a multicasting apparatus that includes a plurality of the arrayed waveguide devices in accordance with the invention.

When used in a single WDM-PON, the AWG device 5 is a broadcast device that delivers information to all destinations. When a plurality of AWG devices 5 are used, either in a single-PON or multiple-PON environment, the broadcast wavelength can be made different between the different AWG devices 5. This way, a multicast function can be achieved even if each AWG device 5 broadcasts to all the outputs that it serves. FIG. 13 shows a multicasting apparatus 70 that includes a plurality of the arrayed waveguide devices 5A, 5B, and 5C. The different arrayed waveguide devices 5A, 5B, 5C in this apparatus are fed single-wavelength signals of different wavelengths $\lambda_{B1}, \lambda_{B2}, \lambda_{B3}, \ldots$. The wavelengths that are fed into the first input waveguide 10 of the different arrayed waveguide devices 5 may all be the same. After being combined with the different single-wavelength signals $\lambda_{B1}, \lambda_{B2}, \lambda_{B3}, \ldots$, the signals exiting the output waveguides 50A, 50B, and 50C are each directed to different subscribers. This way, certain information can be broadcast to a subgroup of subscribers. Some or all of the arrayed waveguide devices 5 may be substituted with one of the alternative embodiments.

Figure 14:
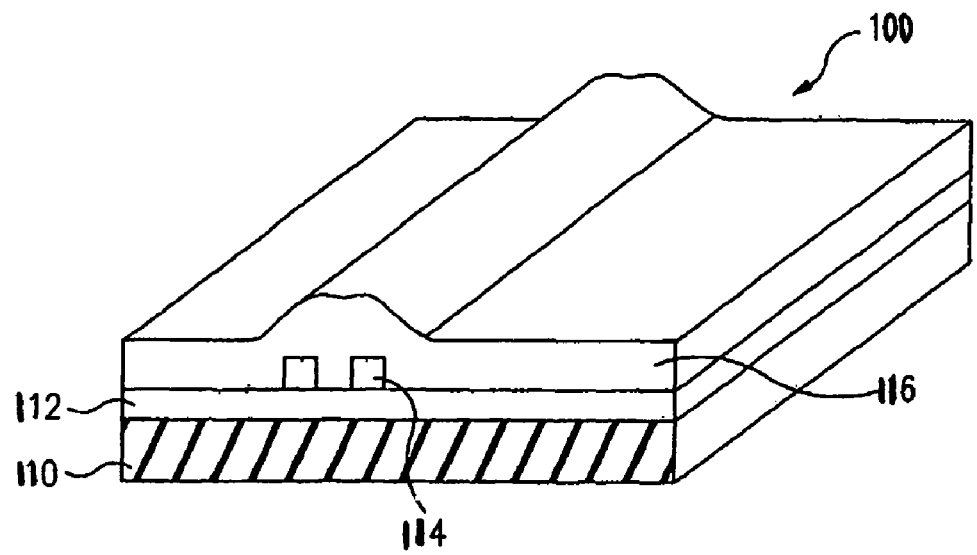
FIG. 14 is a cross sectional view of an exemplary AWG device.

The AWG device 5 may be implemented in the form of a monolithic semiconductor chip. In one embodiment, the AWG device 5 may be formed with three layers on a planar substrate. Referring to FIG. 14, an exemplary AWG device 100 is formed on a planar substrate 110. The substrate 110 may be a semiconductor wafer or a layer formed on the surface of the wafer. Lower cladding layer 112 is a layer of doped or pure $SiO_2$, which may be formed by CVD or oxidation. Alternatively, it may be formed using the linear injector APCVD method using pure or doped TEOS. The total dopant level for the lower cladding layer 112 is typically about 0-10 wt %. If the substrate 110 is quartz glass or fused silica, the substrate itself may act as the lower cladding layer 112. The thickness of lower cladding layer 112 is generally between 2 and 20 μm.

Core 114 is pure or doped $SiO_2$. Examples of suitable dopants include $P_2O_5$, $GeO_2$, and $TiO_2$. The core dopants increase the material's refractive index in order to obtain the required optical properties of the completed device. The refractive index of the core is normally 0.2% to 2% greater than that of the cladding layers. The total dopant level for the core layer is typically about 1-20 wt % and the film thickness is typically about 1-10 μm.

The upper cladding layer 116 is pure or doped $SiO_2$. For example, $P_2O_5$ or $B_2O_3$ may be used as dopants in the upper cladding layer 116. The refractive index of the upper cladding layer 116 is generally matched to the refractive index of the lower cladding layer 112. The total dopant level for the upper cladding layer 116 is generally about 0-15 wt % and the thickness is typically about 2-20 μm.

Figure 15:
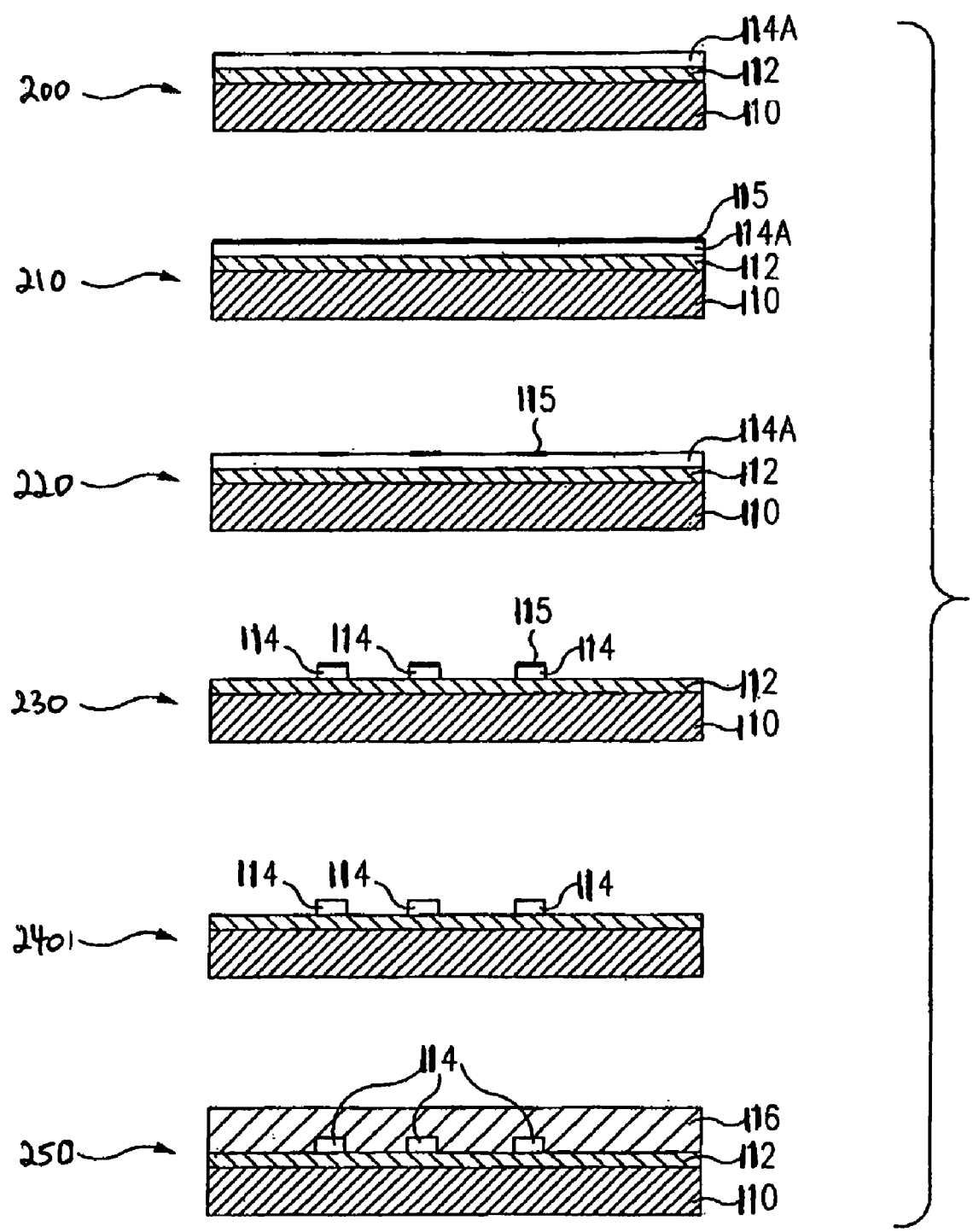
FIG. 15 depicts an exemplary process that may be used for making the device of FIG. 14.

FIG. 15 depicts an exemplary process that may be used for making the exemplary AWG device 100. In step 200, the lower cladding layer 112 has already been formed by CVD or oxidation on substrate 110. The core layer 114A is formed on top of the lower cladding layer. In step 210, photoresist layer 115 is spun on to the surface of core layer 114A. In step 220, the waveguide patterns are defined using standard lithography techniques. In step 230, cores 114 are formed with reactive ion etching (RIE) using standard etching techniques. In step 240, the residual photoresist material is removed. In step 250, the upper cladding layer 116 is formed using the method of the invention. The upper cladding layer 116 substantially covers the core structure.

Figure 16:
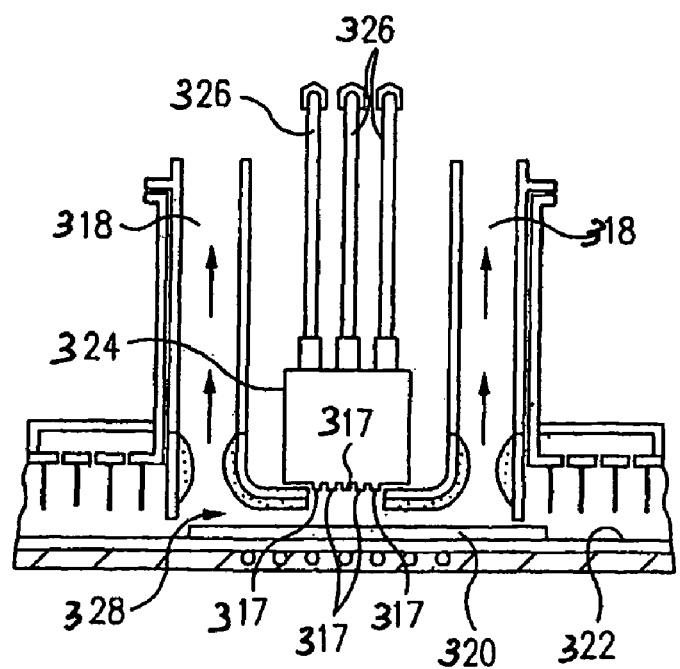
FIG. 16 depicts an exemplary apparatus that may be used to perform the method of FIG. 15.

FIG. 16 depicts an exemplary apparatus that may be used to perform the method of FIG. 15. Wafer 320 is moved through reaction chamber 328 by conveyer 322. The conveyer 322 may include a heating element which heats the wafer (not shown). For example, the wafer may be heated to approximately 500° C. Alternately, other methods may be used to heat the wafer. The wafer is heated in order to allow the raw materials to react on the surface of the wafer to form the necessary layers.

Raw material source lines 326 (which may transport TEOS, dopant source materials such as TMOG, TMPi, MEPo, TMB, and TEB, or oxidizing agents) transport the raw materials to the linear injector 324. The oxidizing agent used in the process is typically an $O_2/O_3$ mixture; for example, 30 g/m³ of $O_3$ in $O_2$. The raw materials are transported through one or more injection ports 317 toward heated wafer 320. When the materials reach the heated wafer 320, they react with the surface material and form a layer on the surface. The linear injector does not provide raw materials to the entire surface of the wafer at one time; instead, the raw materials are provided over an exposure area that depends on the geometry of the injector and the distance between the injector ports and the wafer. The entire surface of the wafer passes through the exposure area as the wafer 320 is moved through the reaction chamber 328 on the conveyer 322. By-products of the reaction and unreacted gases may be removed from the chamber 328 through exhaust ports 318 positioned on either side of the injector 324.

Figure 17:
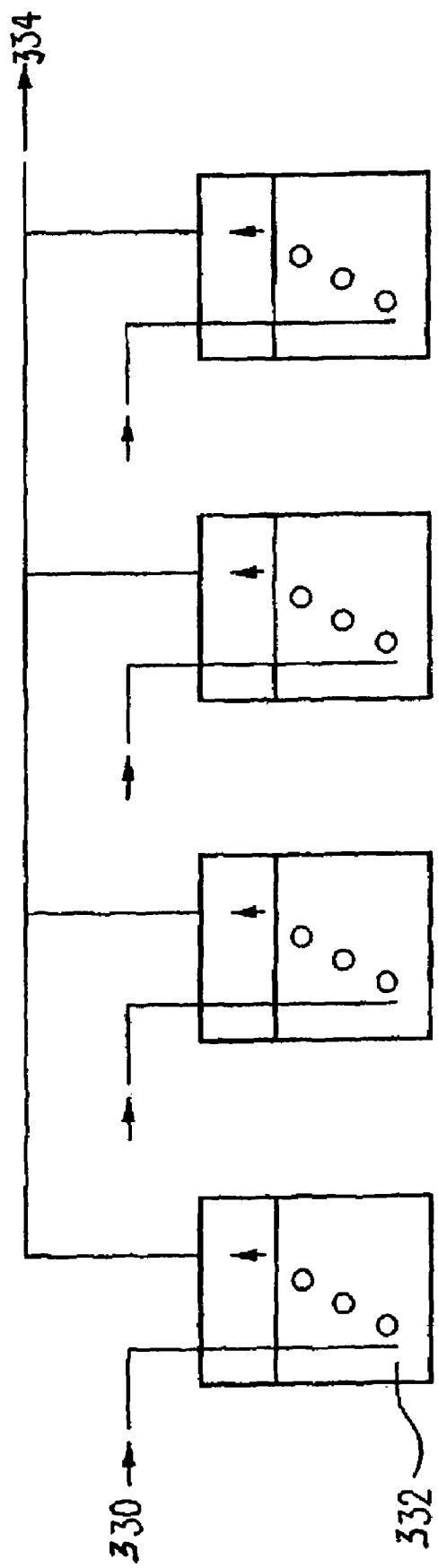
FIG. 17 depicts a method by which raw materials may be transported to the apparatus of FIG. 16.

FIG. 17 depicts a method by which raw materials such as TEOS may be transported to the linear injector. Carrier gas 330, for example nitrogen, enters the bubbler 332 which contains the desired material; for example, TEOS. As the carrier gas 330 passes through the material, it creates bubbles containing the vapor of the material. A mixture 334 of carrier gas 330 and vapor of one or more desired materials flows into the linear injector and then mixes with oxidizing agents. By adjusting and controlling the carrier gas flow rates to the bubblers, the amount of vapor for each material can be precisely maintained. The following formula is used to calculate the amount of each material fed into the linear injector:

$$n=[P_v/(760-P_v)](f/22.4)$$

where n=the number of moles per minute of the material fed into the linear injector, $P_v$=vapor pressure of the material in torr, and f=the carrier gas flow rate in standard liters per minute.

Additional bubblers 335 may be used to provide additional materials, for example they may hold the source materials for one or more dopants.

While the foregoing has been with reference to particular embodiments of the invention, it will be appreciated by those skilled in the art that changes in this embodiment may be made without departing from the principles and spirit of the invention.

The invention claimed is:

1. A data transmission device comprising:
an input Free Propagation Region (FPR) receiving a multi-wavelength signal and a single-wavelength signal from different input waveguides;
a first set of arrayed waveguides coupled to the input FPR to carry the wavelengths in the multi-wavelength signal;
a second set of arrayed waveguides coupled to the input FPR to create multiple copies of the single-wavelength signal; and
an output FPR having an output plane, the output plane receiving the wavelengths from the first set of arrayed waveguides and the copies of the single-wavelength signal from the second set of arrayed waveguides, wherein one of the wavelengths from the first set of arrayed waveguides and one of the copies from the second set of arrayed waveguides focus onto the same position on the output plane.

2. The device of claim 1, wherein the second set of arrayed waveguides has a narrower Free Spectral Range than the first set of arrayed waveguides.

3. The device of claim 1, wherein the Free Spectral Range of the second set of arrayed waveguides is substantially equal to the channel spacing of the first set of arrayed waveguides.

4. The device of claim 3, wherein the Free Spectral Range of the second set of arrayed waveguides is about 25 µm.

5. The device of claim 1, wherein the second set of arrayed waveguides has an order of about 20 to about 50 and the single-wavelength signal reproduces higher adjacent orders at the same output waveguides.

6. The device of claim 1, wherein the spatial channel separation between adjacent wavelengths in the multi-wavelength signal is about 25 µm at the output plane of the output FPR.

7. The device of claim 1, wherein the spatial Free Spectral Range for the two adjacent wavelengths is about 900 µm at the output plane of the output FPR.

8. The device of claim 1, wherein at least one of the first and second sets of arrayed waveguides is a grating.

9. The device of claim 1, wherein the device is a monolithic chip.

10. A multicasting apparatus comprising:
a first device comprising:
a first input Free Propagation Region (FPR) receiving a multi-wavelength signal and a first single-wavelength signal from different input waveguides;
a first multiplexing/demultiplexing arrayed waveguide coupled to the input FPR to carry the wavelengths in the multi-wavelength signal;
a first broadcast arrayed waveguide coupled to the input FPR to create multiple copies of the first single-wavelength signal; and
a first output FPR coupled to the first multiplexing/demultiplexing arrayed waveguide and the first broadcast arrayed waveguide, the first output FPR having a first output plane wherein one of the wavelengths from the first multiplexing/demultiplexing arrayed waveguide and one of the copies of the first single-wavelength signal focus onto the same position on the first output plane;
a second device comprising:
a second input Free Propagation Region (FPR) receiving the multi-wavelength signal and a second single-wavelength signal from different input waveguides;
a second multiplexing/demultiplexing arrayed waveguide coupled to the input FPR to carry the wavelengths in the multi-wavelength signal;
a second broadcast arrayed waveguide coupled to the input FPR to create multiple copies of the second single-wavelength signal; and
a second output FPR coupled to the second multiplexing/demultiplexing arrayed waveguide and the second broadcast arrayed waveguide, the second output FPR having a second output plane wherein one of the wavelengths from the second multiplexing/demultiplexing arrayed waveguide and one of the copies of the second single-wavelength signal focus onto the same position on the second output plane;
wherein the first and second single-wavelength signals have different wavelengths.

* * * * *